(12) United States Patent
Chin et al.

(10) Patent No.: US 8,861,416 B2
(45) Date of Patent: Oct. 14, 2014

(54) POWER SAVINGS FOR INTER-RADIO ACCESS TECHNOLOGY MEASUREMENT

(75) Inventors: Tom Chin, San Diego, CA (US); Wei Zhang, San Diego, CA (US); Guangming Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/565,435

(22) Filed: Aug. 2, 2012

(65) Prior Publication Data

US 2013/0336183 A1 Dec. 19, 2013

Related U.S. Application Data

(60) Provisional application No. 61/659,812, filed on Jun. 14, 2012.

(51) Int. Cl.
*H04W 52/02* (2009.01)
*H04W 48/16* (2009.01)
*H04W 36/00* (2009.01)

(52) U.S. Cl.
CPC ...... *H04W 52/0203* (2013.01); *H04W 36/0088* (2013.01); *H04W 52/029* (2013.01); *Y02B 60/50* (2013.01); *H04W 48/16* (2013.01)
USPC ........................................ 370/311

(58) Field of Classification Search
CPC ..... H04W 84/18; H04W 84/12; H04W 52/02; H04W 52/0203; H04W 36/30; H04W 32/24
USPC .......................................... 370/311, 310, 332
See application file for complete search history.

(56) References Cited

U.S. PATENT DOCUMENTS

| | | | |
|---|---|---|---|
| 7,085,246 B1 * | 8/2006 | LaRosa et al. | 370/311 |
| 2009/0291713 A1 | 11/2009 | Tsukamoto et al. | |
| 2010/0069128 A1 * | 3/2010 | Cheng et al. | 455/574 |
| 2010/0142487 A1 | 6/2010 | Kim | |
| 2010/0165975 A1 * | 7/2010 | Lerzer et al. | 370/350 |
| 2010/0278150 A1 * | 11/2010 | Park et al. | 370/332 |
| 2012/0014258 A1 | 1/2012 | Chin et al. | |
| 2012/0142337 A1 | 6/2012 | Wang et al. | |
| 2013/0189972 A1 * | 7/2013 | Martin et al. | 455/423 |

* cited by examiner

*Primary Examiner* — Andrew Lai
*Assistant Examiner* — Zhiren Qin
(74) *Attorney, Agent, or Firm* — Kristine U. Ekwueme (57) ABSTRACT

A user equipment may save power and improve performance by dynamically switching between a higher and lower clock speed based on the timing of inter-RAT measurement. When a user equipment (UE) is not performing an inter-RAT measurement, the UE uses a clock speed lower than the clock speed associated with inter-RAT measurements. This power saving mode associated with the lower clock speed implementation may be maintained as a default mode when the UE is not performing inter-RAT measurements. The UE may use the higher clock speed when a particular processor power is specified for inter-RAT measurement.

16 Claims, 7 Drawing Sheets

FIG. 7

POWER SAVINGS FOR INTER-RADIO ACCESS TECHNOLOGY MEASUREMENT

CROSS-REFERENCE TO RELATED APPLICATION

This application claims the benefit under 35 U.S.C. §119 (e) to U.S. Provisional Patent Application No. 61/659,812, entitled, POWER SAVINGS FOR INTER-RADIO ACCESS TECHNOLOGY MEASUREMENT, filed on Jun. 14, 2012, in the names of CHIN, et al., the disclosure of which is expressly incorporated by reference herein in its entirety.

BACKGROUND

1. Field

Aspects of the present disclosure relate generally to wireless communication systems, and more particularly, to power savings for inter-radio access technology measurement.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA) that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

According to one aspect of the present disclosure, a method for wireless communication includes determining when a user equipment (UE) is performing inter-radio access technology (RAT) measurement. The method may also include operating the UE at a first clock speed during inter-RAT measurement. The method may also include operating the UE at a second clock speed lower than the first clock speed otherwise.

According to another aspect of the present disclosure, an apparatus for wireless communication includes means for determining when a user equipment (UE) is performing inter-radio access technology (RAT) measurement. The apparatus may also include means for operating the UE at a first clock speed during inter-RAT measurement. The apparatus may also include means for operating the UE at a second clock speed lower than the first clock speed otherwise.

According to one aspect of the present disclosure, a computer program product for wireless communication in a wireless network includes a computer readable medium having non-transitory program code recorded thereon. The program code includes program code to determine when a user equipment (UE) is performing inter-radio access technology (RAT) measurement. The program code also includes program code to operate the UE at a first clock speed during inter-RAT measurement. The program code also includes program code to operate the UE at a second clock speed lower than the first clock speed otherwise.

According to one aspect of the present disclosure, an apparatus for wireless communication includes a memory and a processor(s) coupled to the memory. The processor(s) is configured to determine when a user equipment (UE) is performing inter-radio access technology (RAT) measurement. The processor(s) is further configured to operate the UE at a first clock speed during inter-RAT measurement. The processor(s) is further configured to operate the UE at a second clock speed lower than the first clock speed otherwise.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
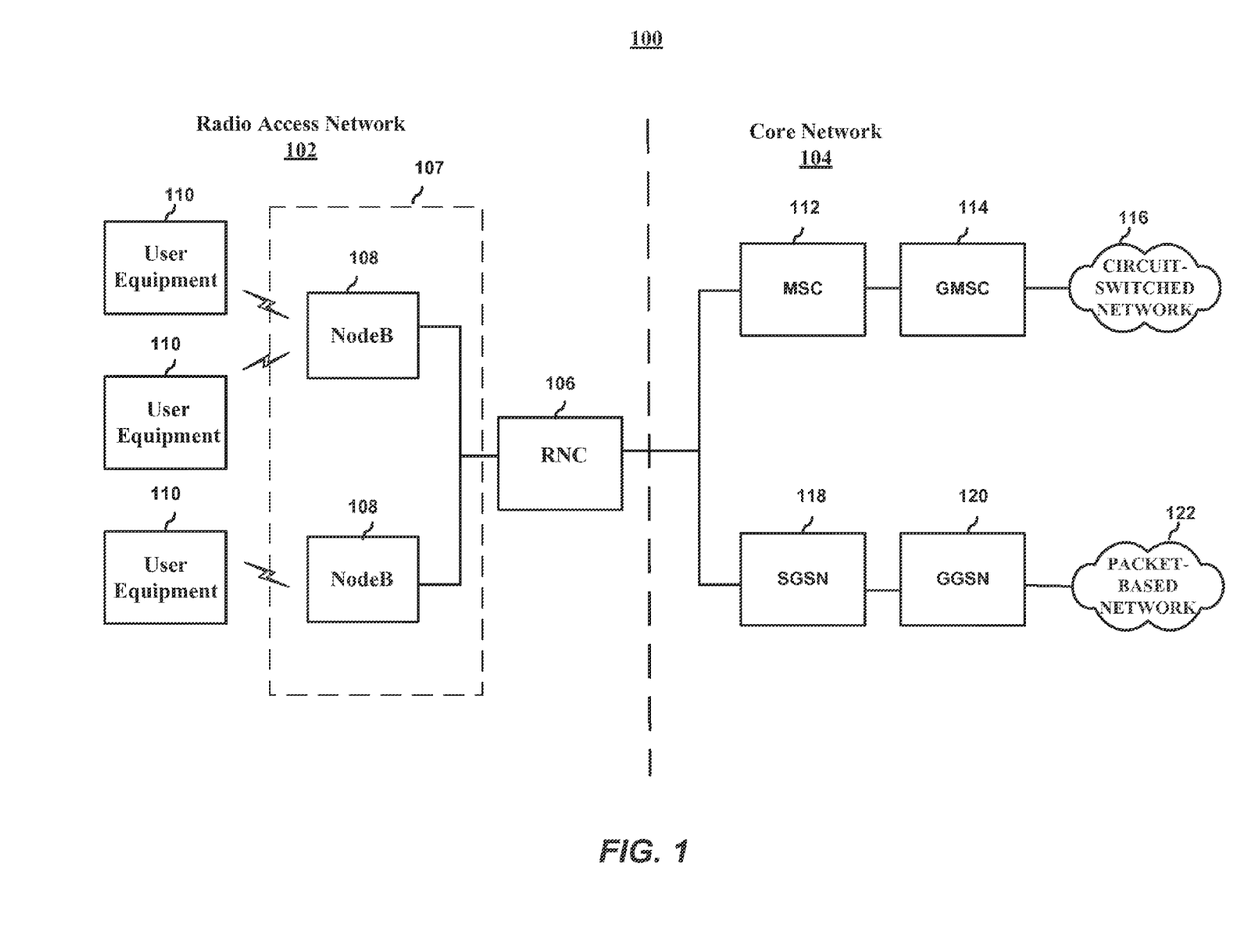
FIG. 1 is a block diagram conceptually illustrating an example of a telecommunications system.

Turning now to FIG. 1, a block diagram is shown illustrating an example of a telecommunications system 90. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
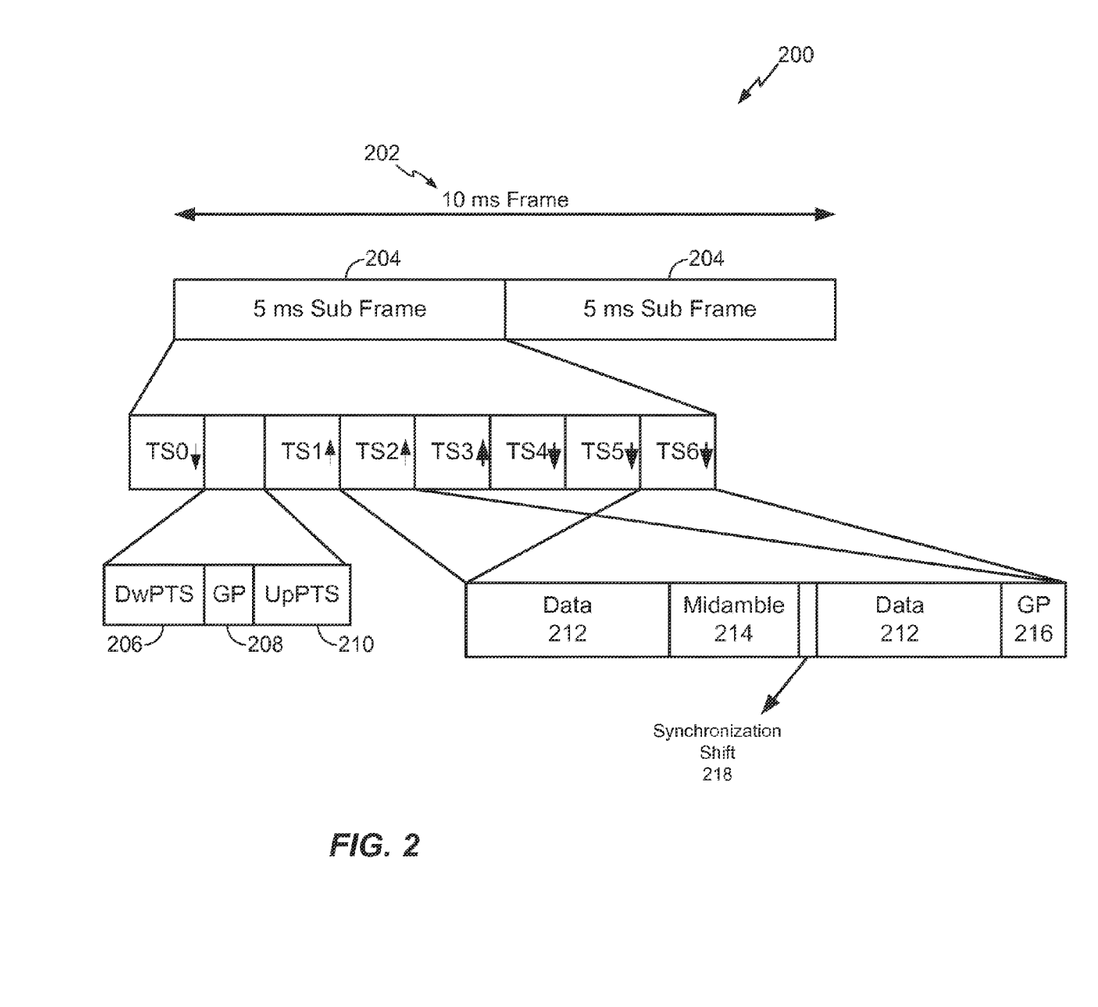
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS)

210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization Shift bits 218 only appear in the second part of the data portion. The Synchronization Shift bits 218 immediately following the midamble can indicate three cases: decrease shift, increase shift, or do nothing in the upload transmit timing. The positions of the SS bits 218 are not generally used during uplink communications.

Figure 3:
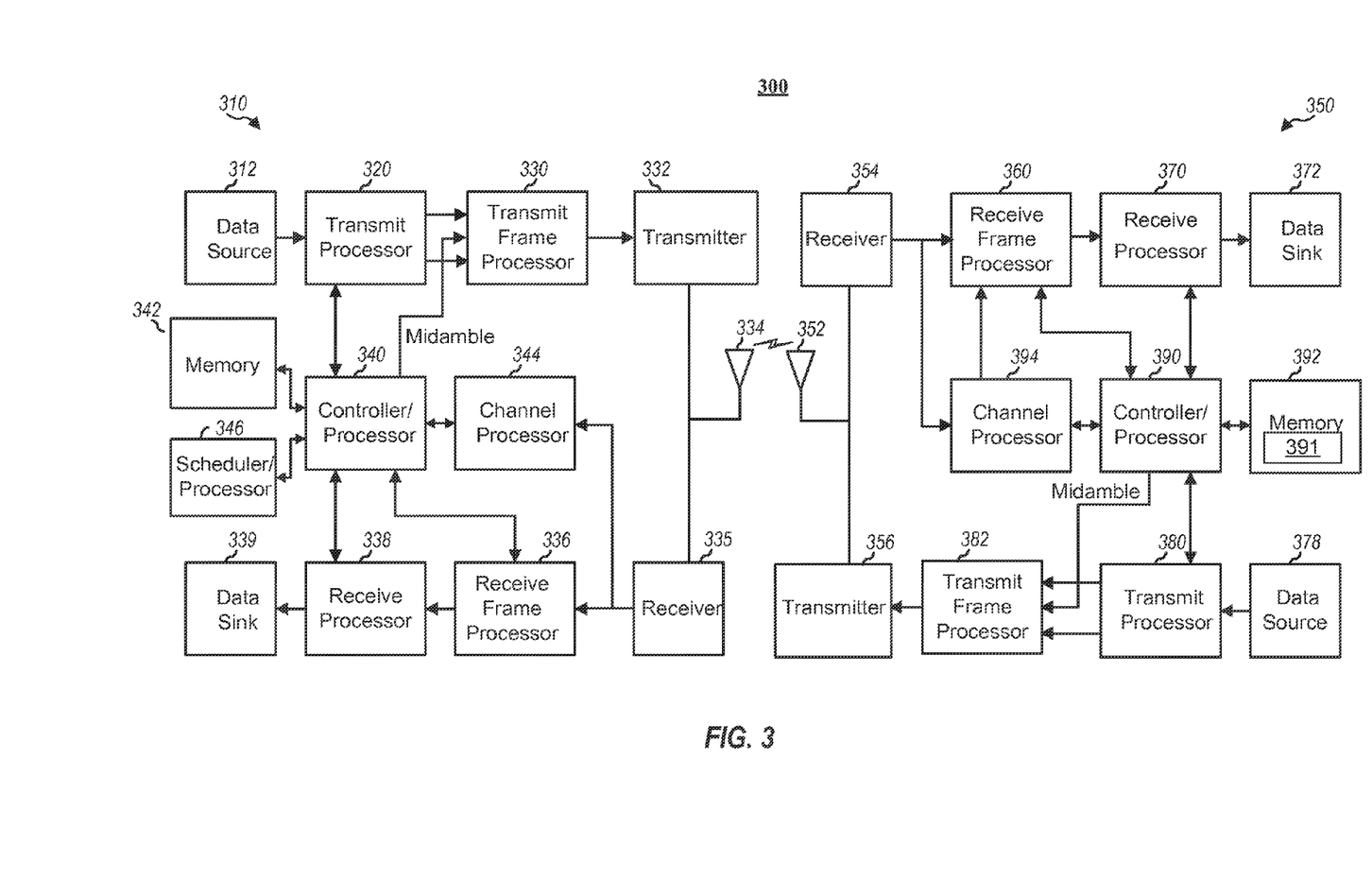
FIG. 3 is a block diagram conceptually illustrating an example of a node B in communication with a UE 350 in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receive processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The processor 340/390 and/or other processors and modules at the node B 310/UE 350 may perform or direct the execution of the functional blocks illustrated in FIG. 6. The computer readable media of memories 342 and 392 may store data and software for the node B 310 and the UE 350, respectively. For example, the memory 392 of the UE 350 may store inter-radio access technology measurement power saving module 391 which, when executed by the controller/processor 390, configures the UE 350 for dynamically switching between a higher and lower clock speed based on timing of inter-RAT measurements. A scheduler/processor 346 at the node B 310 may be used to allocate resources to the UEs and schedule downlink and/or uplink transmissions for the UEs.

Power Savings for Inter-Radio Access Technology Measurement

Figure 4:
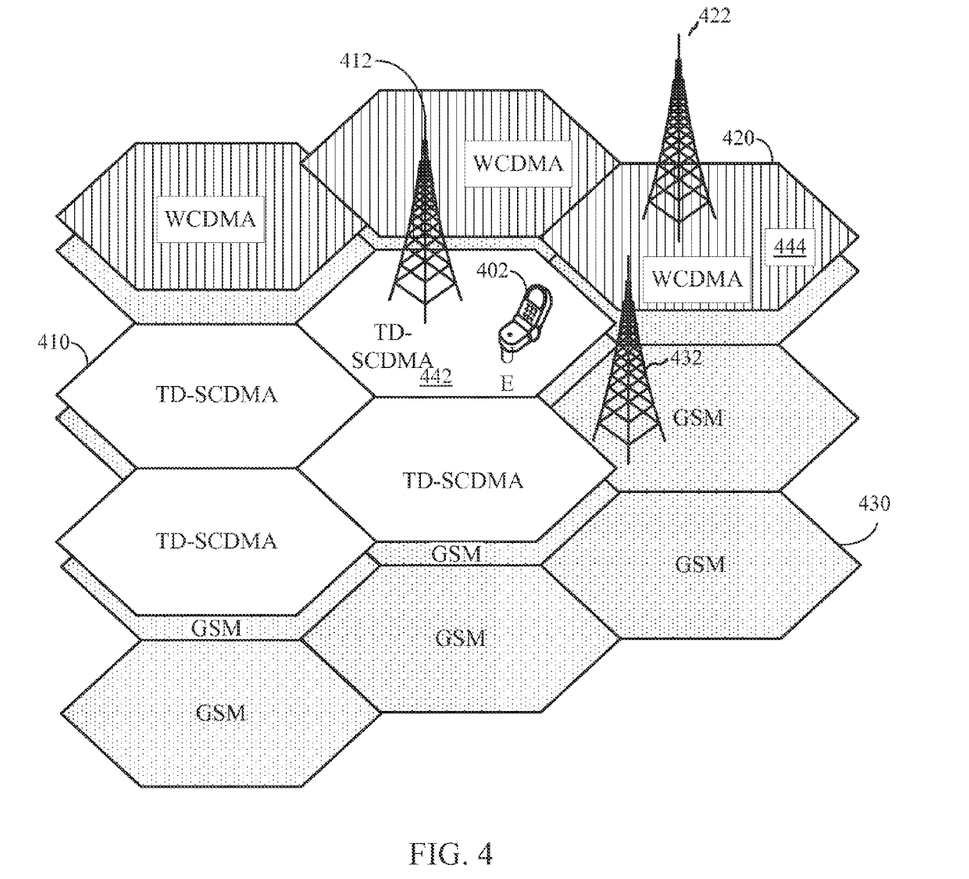
FIG. 4 illustrates a geographical area with coverage from three radio access technologies according to one aspect of the present disclosure.

Deployment of a TD-SCDMA network may not provide complete geographic coverage in certain areas during the migration from legacy radio access technologies (RATs) to newer ones, e.g., from 2G to 3G or from 3G to 4G. In areas where TD-SCDMA networks are deployed, other networks (such as WCDMA and Global System for Mobile Communications (GSM)) may also have a geographical presence. FIG. 4 illustrates a geographical area with coverage from three radio access technologies according to one aspect of the present disclosure. In this example network deployment the UE may be in the vicinity of the TD-SCDMA network but may continue to perform inter-radio access technology (inter-RAT) measurement of other radio access technologies, e.g., GSM, WCDMA or LTE network. This measurement may be implemented for a cell or base station reselection procedure from the TD-SCDMA cell to the GSM/WCDMA/LTE cell. Inter-RAT measurement may be implemented, for example, due to limited coverage of TD-SCDMA or when the UE 350 desires a better RAT, e.g., LTE, for higher data rate during transmission.

A first network coverage area 410 partially overlaps with a second network coverage area 420 and a third network coverage area 430. In one aspect, the first network coverage area 410 is a TD-SCDMA network, the second network coverage area 420 is a WCDMA network, and the third network coverage area 430 is a GSM network.

Generally, the different networks may have certain advantages and disadvantages. For example, the GSM network 430 provides matured circuit-switched services, which is advantageous for voice calls. That is, the GSM network 430 may offer more network coverage to allow un-disrupted voice call services in handovers. As another example, the WCDMA network 420 and the TD-SCDMA network 410 provide high performance packet-switched services, which is advantageous for data calls. That is, the WCDMA network 420 and the TD-SCDMA network 410 may offer higher data rates for data call services.

Inter-RAT measurement may be triggered for a variety of reasons, such as at scheduled time periods or during certain conditions such as limited coverage area of a desired RAT, a desire to switch RATs for performance reasons (i.e., a higher data rate), etc. The UE 350 may perform inter-RAT measurement of other radio access technologies (e.g., TD-SCDMA or GSM) supported by a base station when a UE 350 receives a neighbor list message for the other RATs from a network or node B 310 associated with the network. The neighbor list message may be sent using system information block (SIB) 19 or other messaging and may provide information to the UE about neighboring cells and RATs.

When a UE is in idle mode, the UE may perform inter-RAT measurement by waking up to monitor paging messages. The inter-RAT measurement may be conducted following monitoring of the paging messages. To perform inter-RAT measurement, a UE may operate with a higher clock speed/rate or central processing unit (CPU) clock speed/rate, increased wake up time and increased power consumption than in standard UE operation. A higher clock speed may be configured to support power consuming functionalities associated with the inter-RAT measurements. For example, because an inter-RAT measurement is a concurrent measurement of two or more systems or networks, it incorporates an increased use of hardware and processing. These increased uses result in a higher UE clock speed in order to support these functionalities. The higher clock speed may result in faster power consumption. In contrast, these power consuming functionalities may not be present when inter-RAT measurements are not being performed. Conventionally, this increased clock speed associated with inter-RAT measurements is maintained even when inter-RAT measurement is not being performed. As a result, it may be desirable to reduce power consumption by reducing clock speed at the UE 350 when inter-RAT measurement is absent.

In one aspect of the disclosure, a UE 350 dynamically switches between a higher and lower clock speed based on the timing of inter-RAT measurement. When the UE 350 is not performing an inter-RAT measurement, the UE 350 uses a clock speed lower than the clock speed associated with inter-RAT measurements. Dynamically lowering the UE clock speed in such situations may conserve UE battery power and improve performance. This power saving mode associated with the lower clock speed implementation may be maintained as a default mode when the UE 350 is not performing inter-RAT measurements. The UE 350 may use the higher clock speed when a processor (e.g., central processing unit) power is specified for inter-RAT measurement. A UE 350 may receive a trigger to perform inter-RAT measurement. The trigger may be a message received at the UE 350 from a node B 310 in the network. The trigger may result in the UE 350 dynamically switching to the higher clock speed.

In one aspect of the present disclosure, inter-RAT measurements are triggered by the reception of a neighbor list (a list of neighboring base stations and their communication parameters) from a node B 310 (e.g., serving base station). The neighbor list may be part of a broadcast message to the UEs 350 in the cell or a unicast message destined to a specific UE 350. For example, a neighbor list of a serving TD-SCDMA cell or network may include a base station from a GSM network. The GSM parameters may include GSM frequency, GSM cell identification, and the like. For example, the neighbor list may include a list of surrounding 2G, 3G, and 4G base stations for inter-RAT measurements. In some implementation, separate neighbor lists may be provided for each type of RAT, or a single list may be provided that includes information for identifying the listed neighbor cells by RAT-type. As noted, some aspects of the disclosure are also applicable to systems that may not utilize a neighbor list. In the implementation where a neighbor list is not used, a comparable implementation for identifying the surrounding neighbors may be adopted. In one aspect, the UE 350 receives a neighbor list from a base station, such as a serving node B 310, and implements inter-RAT measurements based on the reception of the neighbor list.

In one aspect of the present disclosure, inter-RAT measurements are not triggered by the reception of a neighbor list. Instead, the inter-RAT measurements are triggered by a predetermined condition, such as failure of the UE to meet a quality of service metric. Thus, in some implementations, the UE 350 may perform inter-RAT measurement independent of the neighbor list. Although reception of a neighbor list may or may not trigger inter-RAT measurements, the measurements may be based on the list of cells or technologies in a previously received neighbor list.

In some RAT implementations or technologies, e.g., TD-SCDMA or LTE, inter-RAT measurements may be performed infrequently. For example, when triggering of inter-RAT measurement is based on reception of a neighbor list, the network may be configured based on a shorter measurement periodicity or frequency specified in the neighbor list message, which is sent to a UE 350. In this configuration, the UE 350 may more frequently use a lower clock speed instead of the higher clock speed associated with inter-RAT measurements because the lower clock speed implementation reduces processor (e.g., central processing unit) power consumption and reduces battery power consumption.

The lower and/or higher clock speeds may be predetermined clock speeds, which are defined to maintain stability and functionality of the UE 350. Because the inter-RAT measurements are for measuring different technologies the lower and/or higher clock speeds may be predetermined based on the different technologies, which may call for different UE operating clock speeds. Thus, the lower and/or higher clock speeds may be based on the RAT being measured. For example, when the inter-RAT measurements are performed in a region where TD-SCDMA and GSM are implemented, the inter-RAT measurement clock speeds may be based at least in part on the clock speed of the corresponding GSM and TD-SCDMA technologies. The clock speeds may also vary based on an operation mode of the UE 350. For example, the clock speeds may be dependent on whether the UE 350 is in idle mode or in active/traffic mode, which includes data mode, voice mode, and/or multimedia mode. Although the lower and/or higher clock speeds depend on the different modes of operation, the lower clock speed implementation may apply to each mode so long as inter-RAT measurement is not being performed.

Figure 5:
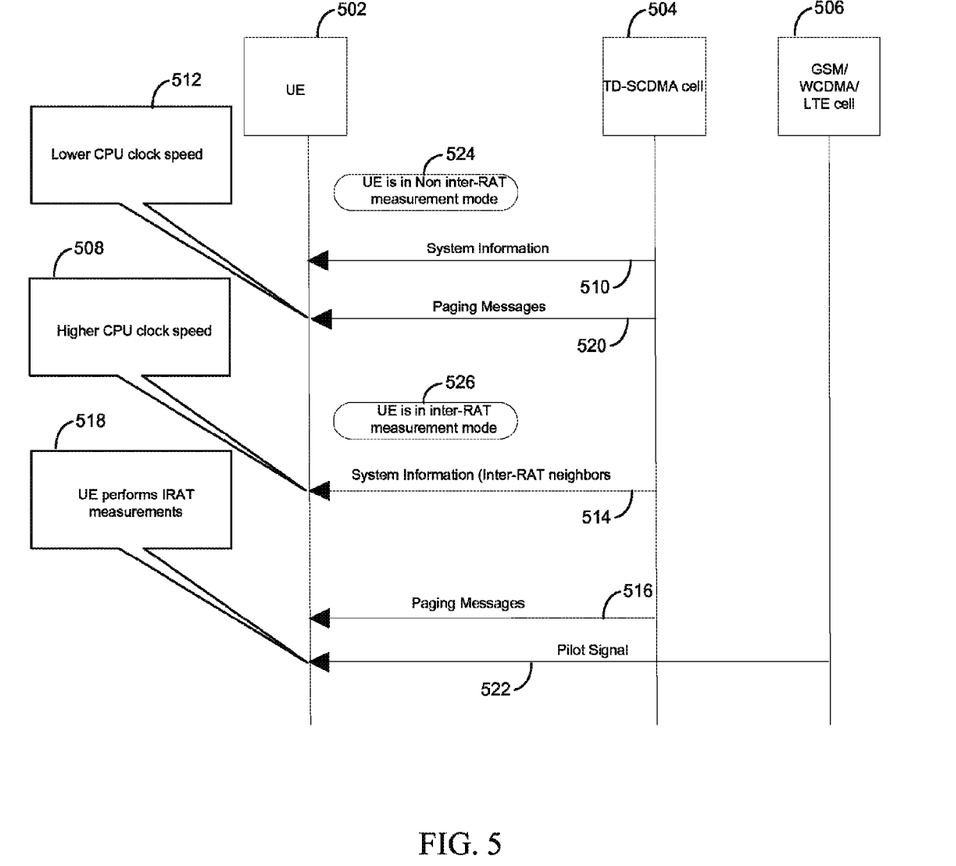
FIG. 5 is a call flow showing an exemplary power saving implementation for inter-radio access technology measurements.

FIG. 5 is a call flow showing an exemplary power saving implementation for inter-radio access technology measurements. A UE 502 may be in the non-inter-RAT measurement mode as shown in block 524. The TD-SCDMA cell 504 sends the UE 502 system information 510. The UE 502 periodically receives paging messages 520 from the serving cell, e.g., TD-SCDMA cell 504. To process the paging messages, the UE 502 wakes up periodically to monitor the paging messages 520. When the UE is operating in the non-inter-RAT measurement mode as shown in block 524, the UE utilizes a lower clock rate 512 to save battery power. In this mode, there is no trigger for inter-RAT measurements (e.g. inter-RAT neighbor cell message from the network).

The UE 502 may be in the inter-RAT measurement mode as shown in block 526. To enable inter-RAT measurements, the TD-SCDMA cell 504 sends the UE 502 system information 514. The system information 514 may include information about the neighbor cells, e.g., neighbor list for the inter-RAT measurements. The UE 502 may then perform inter-RAT measurements of the GSM/WCDMA/LTE signal based on the higher CPU clock rate 508 as shown in block 518. The inter-RAT measurements may be based on pilot signals 522 sent by the GSM/WCDMA/LTE cells 506. In one configuration, in idle mode, the UE may perform inter-RAT measurements when the UE 502 wakes up to monitor paging messages 516. The inter-RAT measurements at block 518 may be conducted following the paging messages 516.

The following table shows a relationship of clock speeds and different neighbor cell configurations in the system information. The clock speed $C_i$ of some rows of the table may be identical. In one aspect of the disclosure, the clock speed $C_7$ may be greater than or equal to each of the clock speeds $C_4$, $C_5$ and $C_6$. Each of the clock speeds $C_4$, $C_5$ and $C_6$ may be greater than or equal to each of the clock speeds $C_1$, $C_2$ and $C_3$. Similarly, each of the clock speeds $C_1$, $C_2$ and $C_3$ may be greater than or equal to the clock speed $C_0$.

| Is GSM neighbor cells in the system information? | Is UTRA neighbor cells in the system information? | Is LTE neighbor cells in the system information? | Clock Speed |
| --- | --- | --- | --- |
| No  | No  | No  | $C_0$ |
| Yes | No  | No  | $C_1$ |
| No  | Yes | No  | $C_2$ |
| No  | No  | Yes | $C_3$ |
| Yes | Yes | No  | $C_4$ |
| No  | Yes | Yes | $C_5$ |
| Yes | No  | Yes | $C_6$ |
| Yes | Yes | Yes | $C_7$ |

Figure 6:
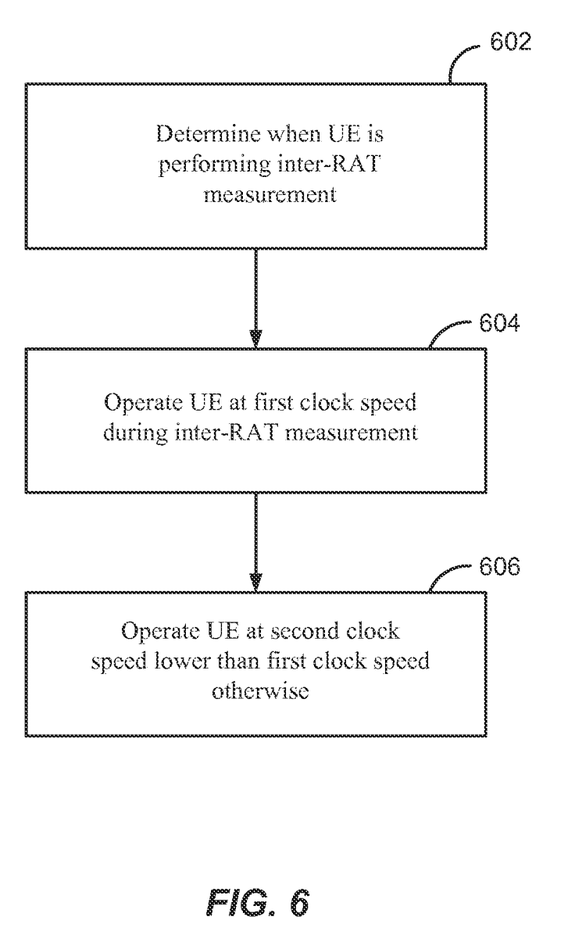
FIG. 6 is a block diagram illustrating a power savings method for inter-radio access technology measurements according to one aspect of the present disclosure.

As shown in FIG. 6 an inter-RAT measurement power saving system of a UE 350 may determine when the UE is performing inter-RAT measurement, as shown in block 602. The inter-RAT measurement power saving system may operate the UE 350 at a first clock speed during the inter-RAT measurement, as shown in block 604. The inter-RAT measurement power saving system may operate the UE 350 at a second clock speed lower than the first clock speed otherwise, as shown in block 606.

Figure 7:
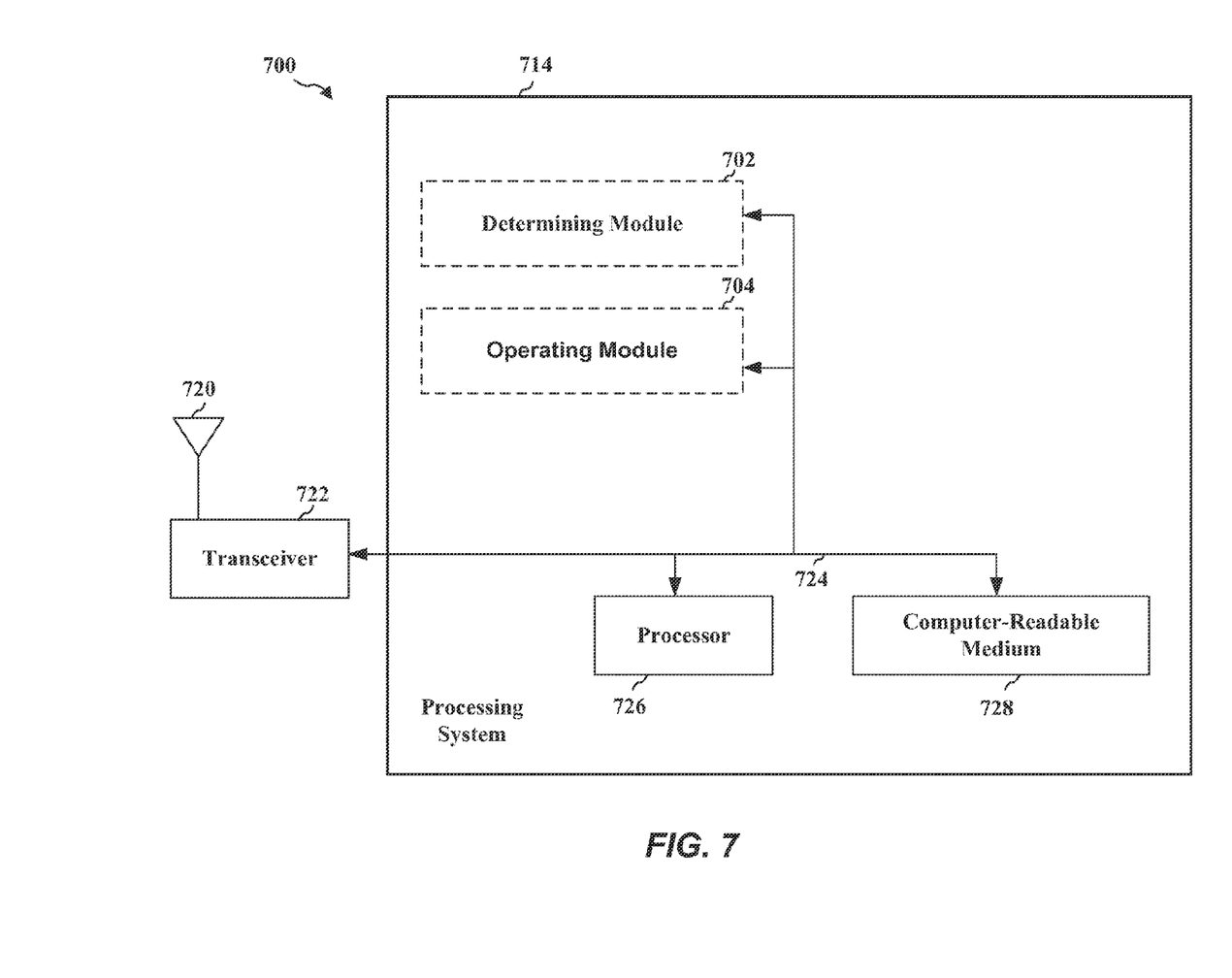
FIG. 7 is a diagram illustrating an example of a hardware implementation for an apparatus employing a processing system.

FIG. 7 is a diagram illustrating an example of a hardware implementation for an apparatus 700 employing an inter-RAT measurement power saving system 714. The inter-RAT measurement power saving system 714 may be implemented with a bus architecture, represented generally by a bus 724. The bus 724 may include any number of interconnecting buses and bridges depending on the specific application of the inter-RAT measurement power saving system 714 and the overall design constraints. The bus 724 links together various circuits including one or more processors and/or hardware modules, represented by a processor 726, a determining module 702 and an operating module 704, and a computer-readable medium 728. The bus 724 may also link various other circuits such as timing sources, peripherals, voltage regulators, and power management circuits, which are well known in the art, and therefore, will not be described any further.

The apparatus includes the inter-RAT measurement power saving system 714 coupled to a transceiver 722. The transceiver 722 is coupled to one or more antennas 720. The transceiver 722 provides a means for communicating with various other apparatus over a transmission medium. The inter-RAT measurement power saving system 714 includes the processor 726 coupled to the computer-readable medium 728. The processor 726 is responsible for general processing, including the execution of software stored on the computer-readable medium 728. The software, when executed by the processor 726, causes the inter-RAT measurement power saving system 714 to perform the various functions described supra for any particular apparatus. The computer-readable medium 728 may also be used for storing data that is manipulated by the processor 726 when executing software. The inter-RAT measurement power saving system 714 further includes the determining module 702 for determining when a UE 350 is performing inter-RAT measurement and the operating module 704 for operating the UE 350 at a first clock speed during the inter-RAT measurement and for operating the UE 350 at a second clock speed lower than the first clock speed otherwise. The determining module 702 and the operating module 704 may be software modules running in the processor 726, resident/stored in the computer-readable medium 728, one or more hardware modules coupled to the processor 726, or some combination thereof. The inter-RAT measurement power saving system 714 may be a component of the UE 350 and may include the memory 392 and/or the processor 390. In one configuration, the apparatus 700 for wireless communication includes means for determining when the UE 350 is performing inter-RAT measurement. The means may be the determining module 702, the memory 392, the processor 390, the inter-RAT measurement power saving module 391 and/or the inter-RAT measurement power saving system 714 of the apparatus 700 configured to perform the functions recited by the measuring and recording means. As described above, the inter-RAT measurement power saving system 714 may include the memory 392 and/or the processor 390. In another aspect, the aforementioned means may be any module or any apparatus configured to perform the functions recited by the aforementioned means.

In one configuration, the apparatus 700 for wireless communication includes means for determining and means for operating. The means may be the operating module 704, the memory 392, the processor 390, the inter-RAT measurement power saving module 391 and/or the inter-RAT measurement power saving system 714 of the apparatus 700 configured to perform the functions recited by the means. As described above, the inter-RAT measurement power saving system 714 may include the memory 392 and/or the processor 390. In another aspect, the aforementioned means may be any module or any apparatus configured to perform the functions recited by the aforementioned means.

Several aspects of a telecommunications system has been presented with reference to TD-SCDMA systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   determining when a user equipment (UE) is performing inter-radio access technology (RAT) measurement;
   operating the UE at a first clock speed during the inter-RAT measurement, in which the first clock speed is based at least in part on a RAT measured in the inter-RAT measurement; and
   operating the UE at a second clock speed lower than the first clock speed otherwise.

2. The method of claim 1, further comprising receiving a network neighbor list and operating the UE at the first clock speed when reception of the network neighbor list triggers the inter-RAT measurement.

3. The method of claim 1, further comprising dynamically switching from the second clock speed to the first clock speed prior to the UE performing the inter-RAT measurement.

4. The method of claim 1, in which the first and the second clock speeds are based at least in part on an operation mode of the UE.

5. An apparatus for wireless communication, comprising:
   means for determining when a user equipment (UE) is performing inter-radio access technology (RAT) measurement;
   means for operating the UE at a first clock speed during the inter-RAT measurement, in which the first clock speed is based at least in part on a RAT measured in the inter-RAT measurement; and
   means for operating the UE at a second clock speed lower than the first clock speed otherwise.

6. The apparatus of claim 5, further comprising means for receiving a network neighbor list and in which the first clock speed operating means further comprises means for operating the UE at the first clock speed when reception of the network neighbor list triggers the inter-RAT measurement.

7. The apparatus of claim 5, further comprising means for dynamically switching from the second clock speed to the first clock speed prior to the UE performing the inter-RAT measurement.

8. The apparatus of claim 5, in which the first and the second clock speeds are based at least in part on an operation mode of the UE.

9. An apparatus for wireless communication, comprising:
   a memory; and
   at least one processor coupled to the memory and configured:
      to determine when a user equipment (UE) is performing inter-radio access technology (RAT) measurement;
      to operate the UE at a first clock speed during the inter-RAT measurement, in which the first clock speed is based at least in part on a RAT measured in the inter-RAT measurement; and
      to operate the UE at a second clock speed lower than the first clock speed otherwise.

10. The apparatus of claim 9, in which the at least one processor is further configured to receive a network neighbor list and in which the at least one processor is further configured to operate the UE at the first clock speed by operating the UE at a first clock speed when reception of the network neighbor list triggers the inter-RAT measurement.

11. The apparatus of claim 9, in which the at least one processor is further configured to dynamically switch from the second clock speed to the first clock speed prior to the UE performing the inter-RAT measurement.

12. The apparatus of claim 9, in which the first and the second clock speeds are based at least in part on an operation mode of the UE.

13. A computer program product for wireless communication in a wireless network, comprising:
   a non-transitory computer-readable medium having program code recorded thereon, the program code comprising:
      program code to determine when a user equipment (UE) is performing inter-radio access technology (RAT) measurement;
      program code to operate the UE at a first clock speed during the inter-RAT measurement, in which the first clock speed is based at least in part on a RAT measured in the inter-RAT measurement; and
      program code to operate the UE at a second clock speed lower than the first clock speed otherwise.

14. The computer program product of claim 13, in which the program code further comprises program code to receive a network neighbor list and in which the program code to operate operates the UE at the first clock speed when reception of the network neighbor list triggers the inter-RAT measurement.

15. The computer program product of claim 13, in which the program code further comprises program code to dynamically switch from the second clock speed to the first clock speed prior to the UE performing the inter-RAT measurement.

16. The computer program product of claim 13, in which the first and the second clock speeds are based at least in part on an operation mode of the UE.

* * * * *